(12) United States Patent
Eshraghi

(10) Patent No.: US 8,168,350 B1
(45) Date of Patent: May 1, 2012

(54) FUEL CELL STRUCTURES AND ASSEMBLIES WITH CHANNELED CURRENT COLLECTORS, AND METHOD OF MAKING THE SAME

(75) Inventor: Ray R. Eshraghi, Cary, NC (US)

(73) Assignee: Microcell Corporation, Raleigh, NC (US)

( * ) Notice: Subject to any disclaimer, the term of this patent is extended or adjusted under 35 U.S.C. 154(b) by 785 days.

(21) Appl. No.: 12/349,483

(22) Filed: Jan. 6, 2009

Related U.S. Application Data

(63) Continuation-in-part of application No. 10/855,927, filed on May 27, 2004, now Pat. No. 7,473,490, and a continuation-in-part of application No. 10/188,471, filed on Jul. 2, 2002, now Pat. No. 6,884,539.

(51) Int. Cl.
H01M 4/64 (2006.01)
H01M 4/80 (2006.01)
(52) U.S. Cl. .................. 429/520; 429/532; 429/235
(58) Field of Classification Search .......... 429/517–522, 429/523, 532, 235
See application file for complete search history.

(56) References Cited

U.S. PATENT DOCUMENTS

| | | |
|---|---|---|
| 309,439 A | 12/1884 | Chillingworth et al. |
| 2,363,140 A | 11/1944 | Persons |
| 2,624,450 A | 1/1953 | Britten et al. |
| 2,753,623 A | 7/1956 | Boessenkool et al. |
| 3,220,107 A | 11/1965 | Clark |
| 3,408,727 A | 11/1968 | Dion |
| 3,455,016 A | 7/1969 | Dion et al. |
| 3,600,790 A | 8/1971 | Dion et al. |
| 3,714,701 A | 2/1973 | Dion et al. |
| 4,101,731 A | 7/1978 | Marancik |
| 4,227,061 A | 10/1980 | Westfall et al. |
| 4,411,762 A | 10/1983 | Kline |

(Continued)

FOREIGN PATENT DOCUMENTS

JP 1253435 A 10/1989

(Continued)

OTHER PUBLICATIONS

Gallant, R., et al., "Precious metal clad wire for use in connectors", "Nineteenth Annual Connectors and Interconnection Technology Symposium Proceedings", Oct. 1986, Publisher: Anomel Products, Inc., Published in: Shrewsbury, MA.

*Primary Examiner* — Patrick Ryan
*Assistant Examiner* — Muhammad Siddiquee
(74) *Attorney, Agent, or Firm* — Hultquist, PLLC; Steven J. Hultquist

(57) ABSTRACT

A channeled metal clad fiber comprises one or more surface channels that extend along directions substantially parallel to the longitudinal axis of such fiber. Metal clad fibers may include multiple protective layers, and one or more protective layers may contain multiple conductors therein. A microfibrous fuel cell structure includes a hollow microfibrous membrane separator having an electrolyte medium therein and defining a bore side and a shell side. An inner current collector formed of a channeled metal clad or unclad metal fiber, and an inner electrocatalyst layer are positioned at the bore side of such fuel cell, and an outer current collector and an outer electrocatalyst layer are positioned at the shell side thereof. Surface channels on the inner current collector provide inner fluid passages for passing a fuel-containing or an oxidant-containing fluid through the microfibrous fuel cell.

19 Claims, 7 Drawing Sheets

U.S. PATENT DOCUMENTS

| | | | | |
|---|---|---|---|---|
| 4,659,637 | A | 4/1987 | Nelson et al. | |
| 4,711,824 | A * | 12/1987 | Van Hoof et al. | 428/607 |
| 4,776,195 | A | 10/1988 | Fukuhara et al. | |
| 4,933,141 | A | 6/1990 | Mankins et al. | |
| 5,087,300 | A * | 2/1992 | Takayama et al. | 29/527.2 |
| 5,279,625 | A | 1/1994 | O'Neil-Bell | |
| 5,296,316 | A | 3/1994 | O'Neil-Bell | |
| 5,483,022 | A | 1/1996 | Mar | |
| 5,492,782 | A | 2/1996 | Higley | |
| 5,693,203 | A | 12/1997 | Ohhashi et al. | |
| 5,897,963 | A | 4/1999 | Seuntjens | |
| 5,916,514 | A * | 6/1999 | Eshraghi | 29/623.1 |
| 5,925,470 | A | 7/1999 | Blanyer et al. | |
| 5,928,808 | A * | 7/1999 | Eshraghi | 429/498 |
| 5,989,300 | A | 11/1999 | Eshraghi | |
| 6,004,691 | A | 12/1999 | Eshraghi | |
| 6,077,364 | A | 6/2000 | Chandler et al. | |
| 6,096,450 | A | 8/2000 | Walsh | |
| 6,113,722 | A | 9/2000 | Hoffman et al. | |
| 6,156,452 | A | 12/2000 | Kozuki et al. | |
| 6,258,187 | B1 | 7/2001 | Chandler et al. | |
| 6,274,250 | B1 | 8/2001 | Terziani | |
| 6,338,913 | B1 | 1/2002 | Eshraghi | |
| 6,399,232 | B1 | 6/2002 | Eshraghi | |
| 6,403,248 | B1 | 6/2002 | Eshraghi | |
| 6,403,517 | B1 | 6/2002 | Eshraghi | |
| 6,444,339 | B1 | 9/2002 | Eshraghi | |
| 6,495,281 | B1 | 12/2002 | Eshraghi | |
| 6,827,747 | B2 | 12/2004 | Lisi et al. | |
| 6,884,539 | B2 | 4/2005 | Eshraghi | |
| 7,020,947 | B2 | 4/2006 | Bradley | |
| 7,354,545 | B2 | 4/2008 | Eshraghi et al. | |
| 7,422,813 | B2 | 9/2008 | Eshraghi et al. | |
| 7,473,490 | B2 | 1/2009 | Eshraghi | |
| 2002/0146611 | A1 | 10/2002 | Kawasaki et al. | |
| 2003/0035990 | A1 | 2/2003 | Washima | |
| 2003/0178224 | A1 | 9/2003 | Goto | |
| 2004/0001988 | A1 | 1/2004 | Yazici et al. | |
| 2004/0005498 | A1 | 1/2004 | Eshraghi | |
| 2004/0058224 | A1 | 3/2004 | Eshraghi et al. | |
| 2004/0175605 | A1 | 9/2004 | Eshraghi et al. | |
| 2004/0191588 | A1 | 9/2004 | Eshraghi et al. | |
| 2005/0181269 | A1 | 8/2005 | Eshraghi et al. | |
| 2006/0118994 | A1 | 6/2006 | Eshraghi et al. | |
| 2007/0243439 | A1 | 10/2007 | Eshraghi et al. | |
| 2009/0130511 | A1 | 5/2009 | Eshraghi et al. | |
| 2009/0130512 | A1 | 5/2009 | Eshraghi et al. | |

FOREIGN PATENT DOCUMENTS

| | | |
|---|---|---|
| JP | 03-044454 A | 2/1991 |
| JP | 03-047617 A | 2/1991 |
| JP | 05-039587 A | 2/1993 |
| JP | H05-331701 A | 12/1993 |
| JP | 7040775 | 2/1995 |
| JP | 08-011598 A | 1/1996 |
| JP | 08-138700 A1 | 5/1996 |
| JP | 09-223507 A | 8/1997 |
| JP | 9223507 A | 8/1997 |
| WO | 0159865 A1 | 8/2001 |
| WO | 03100881 A2 | 12/2003 |

\* cited by examiner

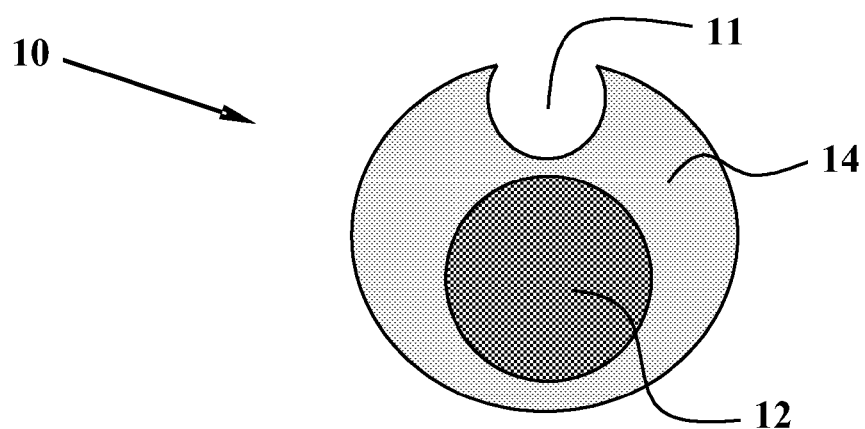
FIG._1A
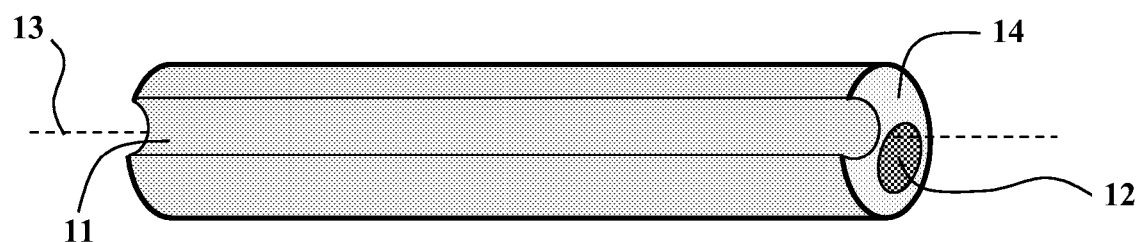
FIG._1B

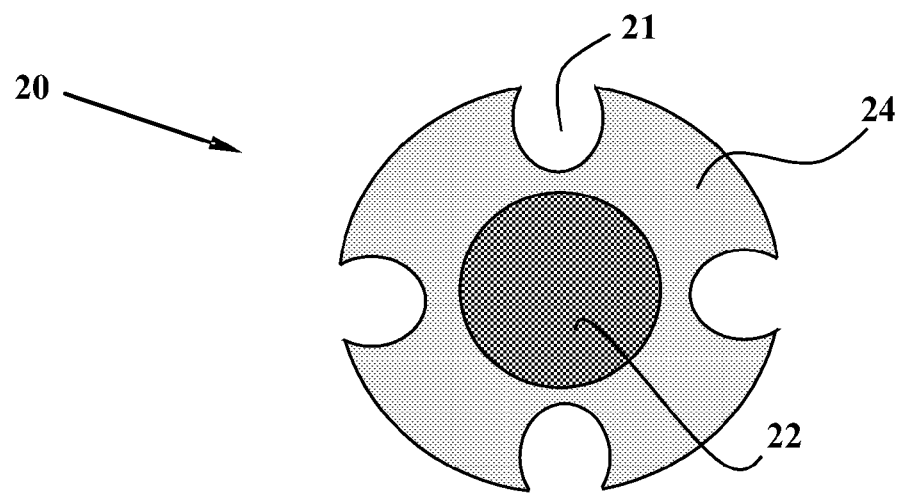
FIG._2A
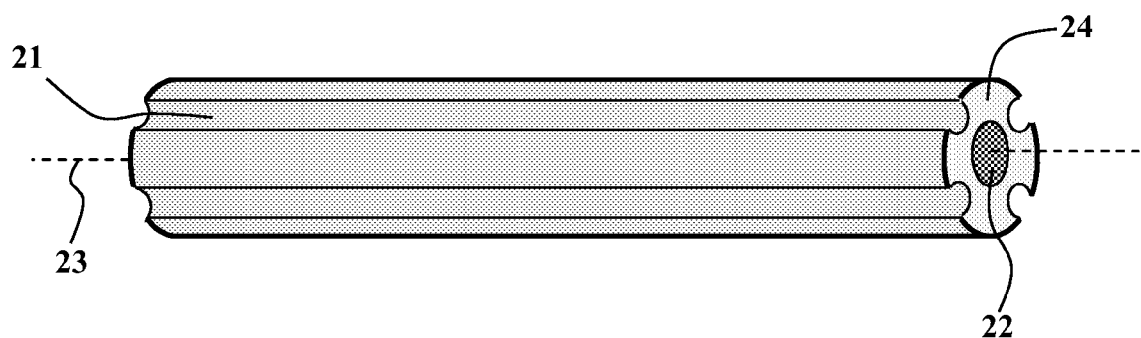
FIG._2B

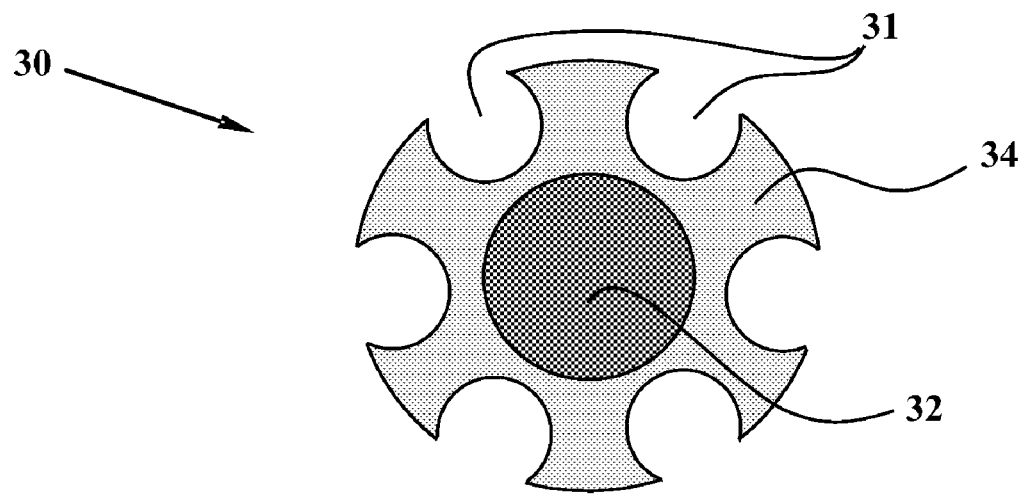
FIG._3
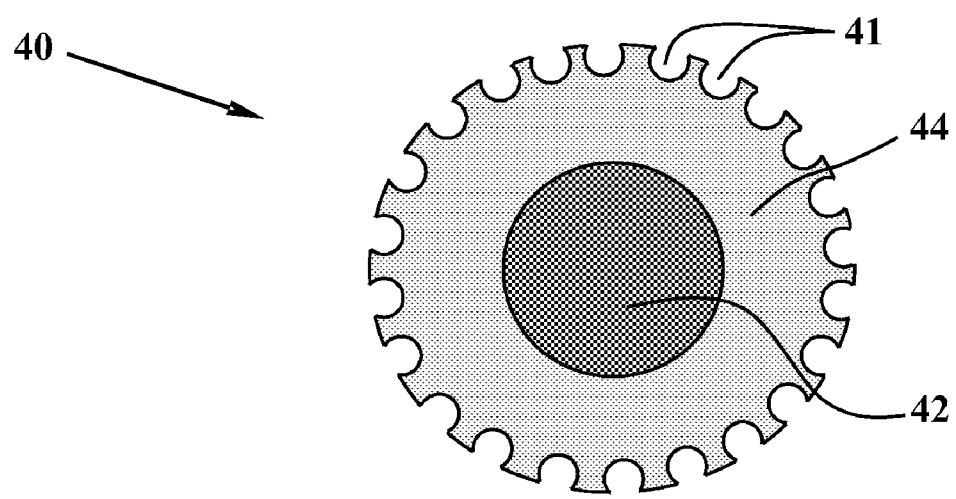
FIG._4

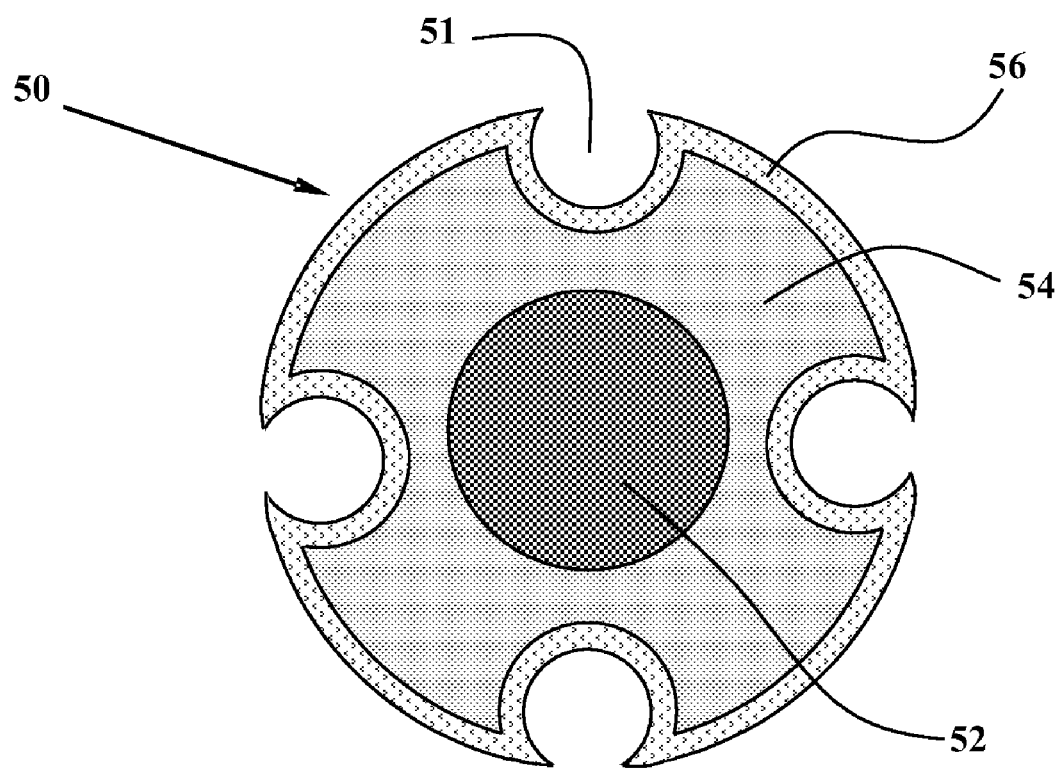
FIG._5

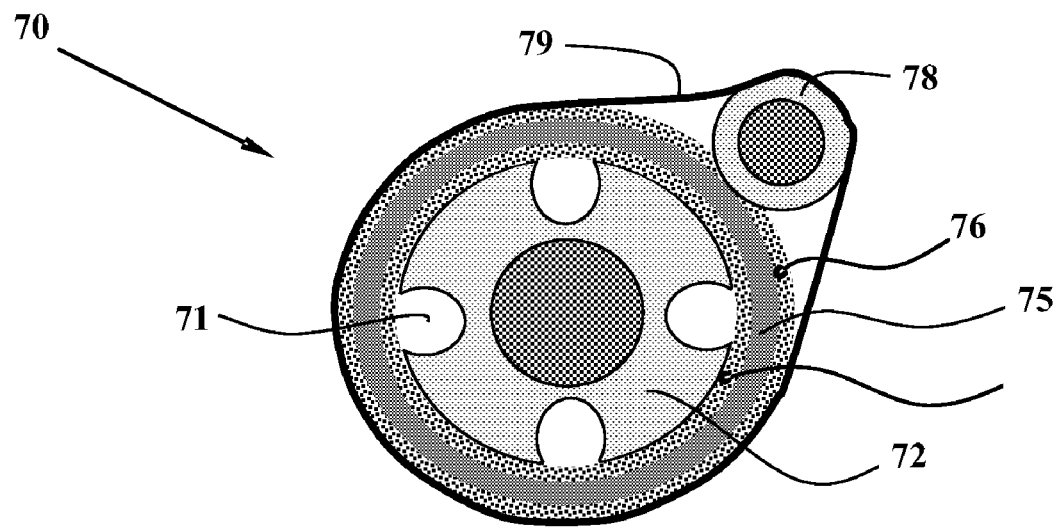
FIG._7
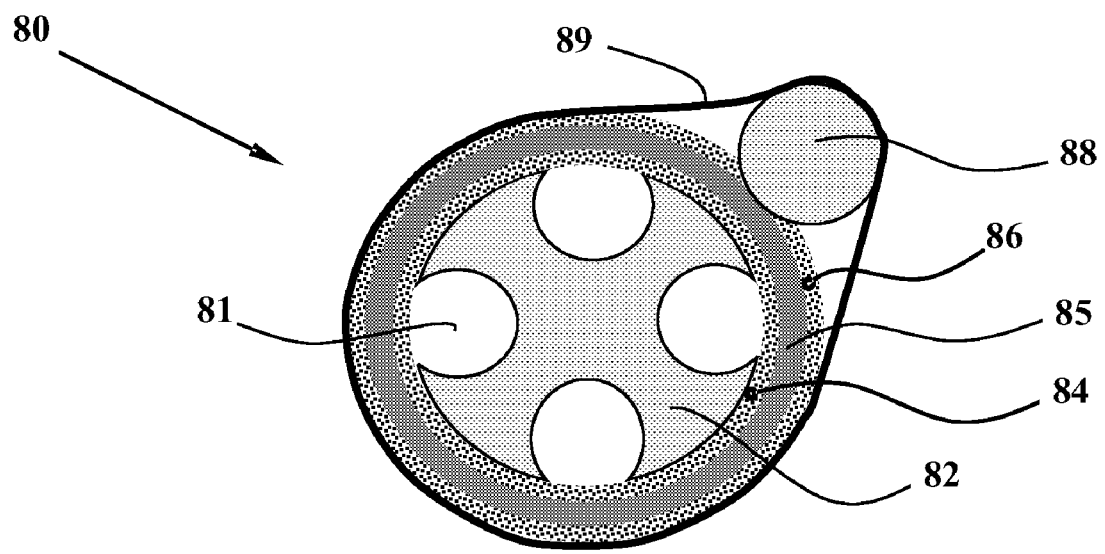
FIG._8

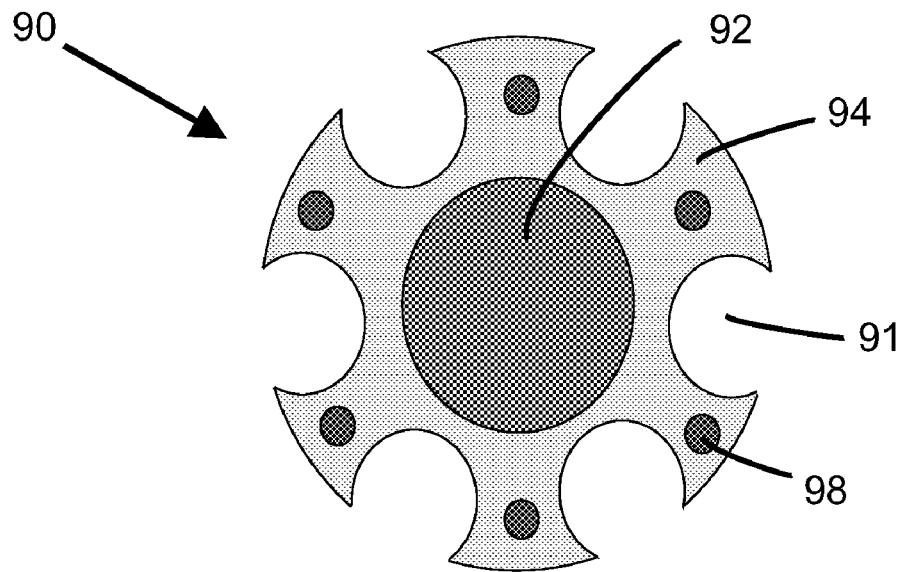
FIG._9
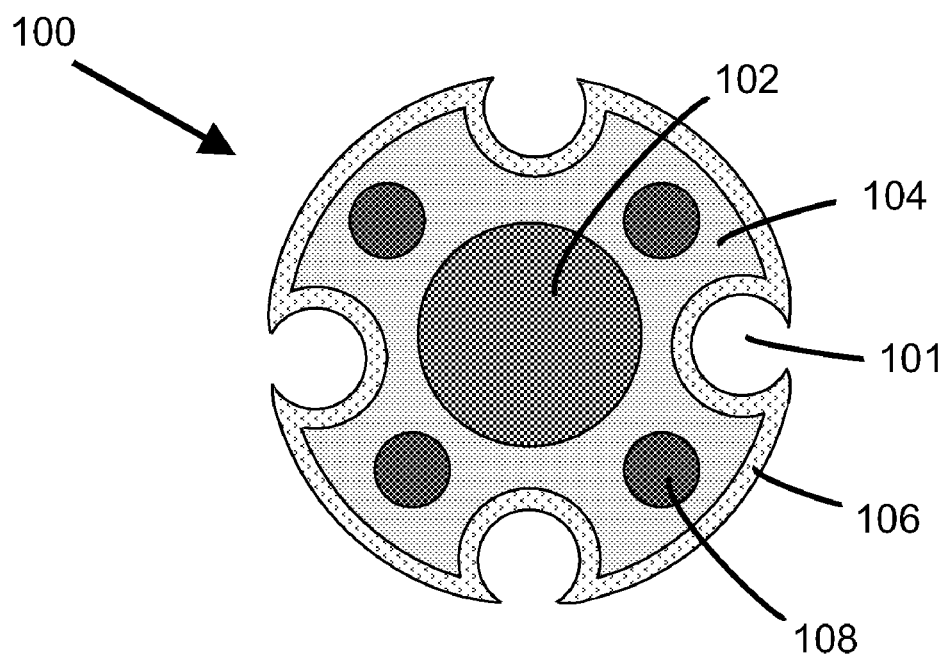
FIG._10

FUEL CELL STRUCTURES AND ASSEMBLIES WITH CHANNELED CURRENT COLLECTORS, AND METHOD OF MAKING THE SAME

CROSS-REFERENCE TO RELATED APPLICATIONS

This is a continuation-in-part of U.S. patent application Ser. No. 10/855,927 filed May 27, 2004 and issuing as U.S. Pat. No. 7,473,490, which is a continuation-in-part of U.S. patent application Ser. No. 10/188,471 filed on Jul. 2, 2002 and issued as U.S. Pat. No. 6,884,539. The disclosures of the foregoing applications and patents are hereby incorporated by reference in their respective entireties.

BACKGROUND OF THE INVENTION

1. Field of the Invention

This invention relates in general to fuel cell structures and assemblies, and method of making the same.

2. Description of the Art

U.S. Pat. Nos. 5,916,514; 5,928,808; 5,989,300; 6,004,691; 6,338,913; 6,399,232; 6,403,248; 6,403,517; 6,444,339; and 6,495,281 describe microfibrous electrochemical cell structures that each contain an inner current collector, an inner electrocatalyst layer, a hollow fibrous membrane separator with electrolyte medium therein, an outer electrocatalyst layer, and an outer current collector. Specifically, both the inner and outer current collects are made of metal fibers and are disposed respectively on the inner and the outer surface of the hollow fibrous membrane separator.

Since such metal-fiber-formed current collectors are directly exposed to the harsh electrochemical environment near the membrane separator surfaces, they are especially susceptible to corrosion. Corrosion of the current collectors can result in ionic contamination of the polymer membrane electrolyte and reduction in ionic conductivity of the cell for transport of protons. In severe cases, electrical disconnection may occur within individual cells or between adjacent cells that are connected together in series or in parallel, which disconnection shortens the useful life of such microfibrous electrochemical cells and reduces the power density of electrochemical assemblies comprising same.

It is accordingly an object of the present invention to provide corrosion-resistant current collectors for prolonging the useful life and enhancing the reliability of such microfibrous electrochemical cells or assemblies comprising same.

Further, for fuel cell applications, the hollow fibrous membrane separator must further provide an inner fluid passage at its bore side, for passing a fuel- or oxidant-containing fluid therethrough. Such inner fluid passage can be easily blocked upon deformation of the hollow fibrous membrane separator, which will in turn reduce the power output of the electrochemical cells. The need for providing and maintaining such inner fluid passage increases the manufacturing costs of the microfibrous fuel cells.

It is therefore another object of the present invention to provide microfibrous fuel cells with inner fluid passage(s) that is easy to produce and blockage-resistant.

Furthermore, for fuel cell applications, the electrical contact generated between the surface of the catalyst and the current collector plays a significant role in the performance of the fuel cell. In general the higher the contact surface area, the lower the contact resistance in the cell, which translates into higher and more efficient power generation.

It is therefore another object of this invention to provide a microfibrous fuel cell with excellent contact between the catalyst layer and the current collector at the bore side of the cell.

Other objects of the present invention will be more fully apparent from the ensuing disclosure and appended claims.

SUMMARY OF THE INVENTION

The present invention in one aspect relates to a fibrous article having a longitudinal axis. Such fibrous article comprises two or more metal layers bonded together by solid-phase bonding, and one or more surface channels extending along directions that are substantially parallel to its longitudinal axis.

Another aspect of the present invention relates to a method for producing a metal clad fiber with surface channels as described hereinabove, by the steps of:

forming a precursor structure that has a longitudinal axis and comprises a metal core and one or more metal protective layers formed over the metal core, with at least one removable metal component partially embedded in at least one of such metal protective layers and partially exposed on a surface of the precursor structure, wherein such one or more metal protective layers are bonded to the metal core as well as to one another by solid-phase bonding, and wherein the removable metal component extends along the longitudinal axis of such precursor structure; and drawing the precursor structure into a fibrous structure; and selectively removing the removable metal component from the fibrous structure, in such manner that the metal core and the one or more protective metal layers form a metal clad fiber that has one or more surface channels extending along directions that are substantially parallel to the longitudinal axis of such metal clad fiber.

Still another aspect of the present invention relates to a microfibrous fuel cell comprising:

a hollow microfibrous membrane separator containing an electrolyte medium and defining a bore side and a shell side;

an inner current collector and an inner electrocatalyst structure at the bore side of such hollow microfibrous membrane separator; and an outer current collector and an outer electrocatalyst structure at the shell side of such hollow microfibrous membrane separator, wherein the inner current collector comprises a metal clad fiber having a longitudinal axis, and wherein such metal clad fiber comprises two or more metal layers bonded together by solid-phase bonding and one or more surface channels extending along directions that are substantially parallel to its longitudinal axis.

Yet another aspect of the present invention relates to a microfibrous fuel cell comprising:

a hollow microfibrous membrane separator containing an electrolyte medium and defining a bore side and a shell side;

an inner current collector and an inner electrocatalyst structure at the bore side of such hollow microfibrous membrane separator; and an outer current collector and an outer electrocatalyst structure at the shell side of such hollow microfibrous membrane separator, wherein the inner current collector comprises a metal fiber having a longitudinal axis and one or more surface channels extending along directions that are substantially parallel to its longitudinal axis.

A further aspect of the present invention relates to a method for producing a metal fiber with surface channels as described hereinabove, by the steps of:

forming a precursor structure that has a longitudinal axis and comprises at least one supporting metal component and at least one removable metal component that is partially embedded in such supporting metal component and partially exposed to a surface of the precursor structure, wherein such removable metal component extends along the longitudinal axis of the precursor structure; and drawing the precursor structure into a fibrous structure; and selectively removing the removable metal component from the fibrous structure, in such manner that the supporting metal component forms a metal fiber having one or more surface channels extending along directions that are substantially parallel to the longitudinal axis of the metal fiber.

A further aspect of the present invention relates to a fibrous article having a longitudinal axis, the article including: a metal-containing core, a metal-containing first protective layer bonded to the core by solid-phase bonding, with the first protective layer having a different material composition than the core; and one or more surface channels extending along directions that are substantially parallel to the longitudinal axis; wherein the core is isolated from contacting the one or more surface channels, and wherein the core comprises material selected from the group consisting of copper, aluminum, brass, bronze, nickel, silver, and alloys including the same.

A further aspect of the present invention relates to a fibrous article having a longitudinal axis and comprising a metal-containing core, a metal-containing first protective layer, and a metal-containing second protective layer bonded together along respective interfaces, with one or more surface channels extending along directions that are substantially parallel to the longitudinal axis, wherein: the first protective layer is formed over the core; the second protective layer is formed over the first protective layer; the first protective layer and the second protective layer comprise at least one different metal or metal alloy; the core is isolated from contact with the one or more surface channels; and the core comprises material selected from the group consisting of copper, aluminum, brass, bronze, nickel, silver, and alloys including the same.

A further aspect of the present invention relates to a fibrous article having a longitudinal axis, the article comprising: a metal-containing core; a metal-containing first protective layer bonded to the core by solid-phase bonding, with the first protective layer having a different material composition than the core; one or more surface channels extending along directions that are substantially parallel to the longitudinal axis; and at least one metal-containing conductor contained in the first protective layer, isolated from contact with the one or more surface channels, and having a different material composition than the first protective layer; wherein the core is isolated from contacting the one or more surface channels.

The terms "microfibrous," "fibrous," and "fiber" are used interchangeably herein to refer to fibrous structures having a cross-sectional outer diameter in a range of from about 10 microns to about 10 millimeters, preferably from about 10 microns to about 5 millimeters, and more preferably from about 100 microns to about 1 millimeter.

Other aspects, features and advantages of the invention will be more fully apparent from the ensuing disclosure and appended claims.

BRIEF DESCRIPTION OF THE DRAWINGS

FIG. 1A is a cross-sectional view of a double-layer metal clad fiber having one surface channel, according to one embodiment of the present invention.

FIG. 1B is a perspective view of the metal clad fiber of FIG. 1A.

FIG. 2A is a cross-sectional view of a double-layer metal clad fiber having four surface channels, according to one embodiment of the present invention.

FIG. 2B is a perspective view of the metal clad fiber of FIG. 2A.

FIG. 3 is a cross-sectional view of a double-layer metal clad fiber having six surface channels, according to one embodiment of the present invention.

FIG. 4 is a cross-sectional view of a double-layer metal clad fiber having multiple surface channels, according to one embodiment of the present invention.

FIG. 5 is a cross-sectional view of a three-layer metal clad fiber having four surface channels, according to one embodiment of the present invention.

FIG. 7 is a cross-sectional view of a microfibrous fuel cell comprising an inner current collector formed of a channeled metal clad fiber, according to another embodiment of the present invention.

FIG. 8 is a cross-sectional view of a microfibrous fuel cell comprising an inner current collector formed of a channeled metal fiber, according to another embodiment of the present invention.

FIG. 9 is a cross-sectional view of a two-layer fibrous article having four surface channels and four conductors contained in a protective layer, according to one embodiment of the present invention.

FIG. 10 is a cross-sectional view of a three-layer fibrous article having four surface channels and four conductors contained in a protective layer, according to one embodiment of the present invention.

DETAILED DESCRIPTION OF THE INVENTION AND PREFERRED EMBODIMENTS THEREOF

Figure 6:
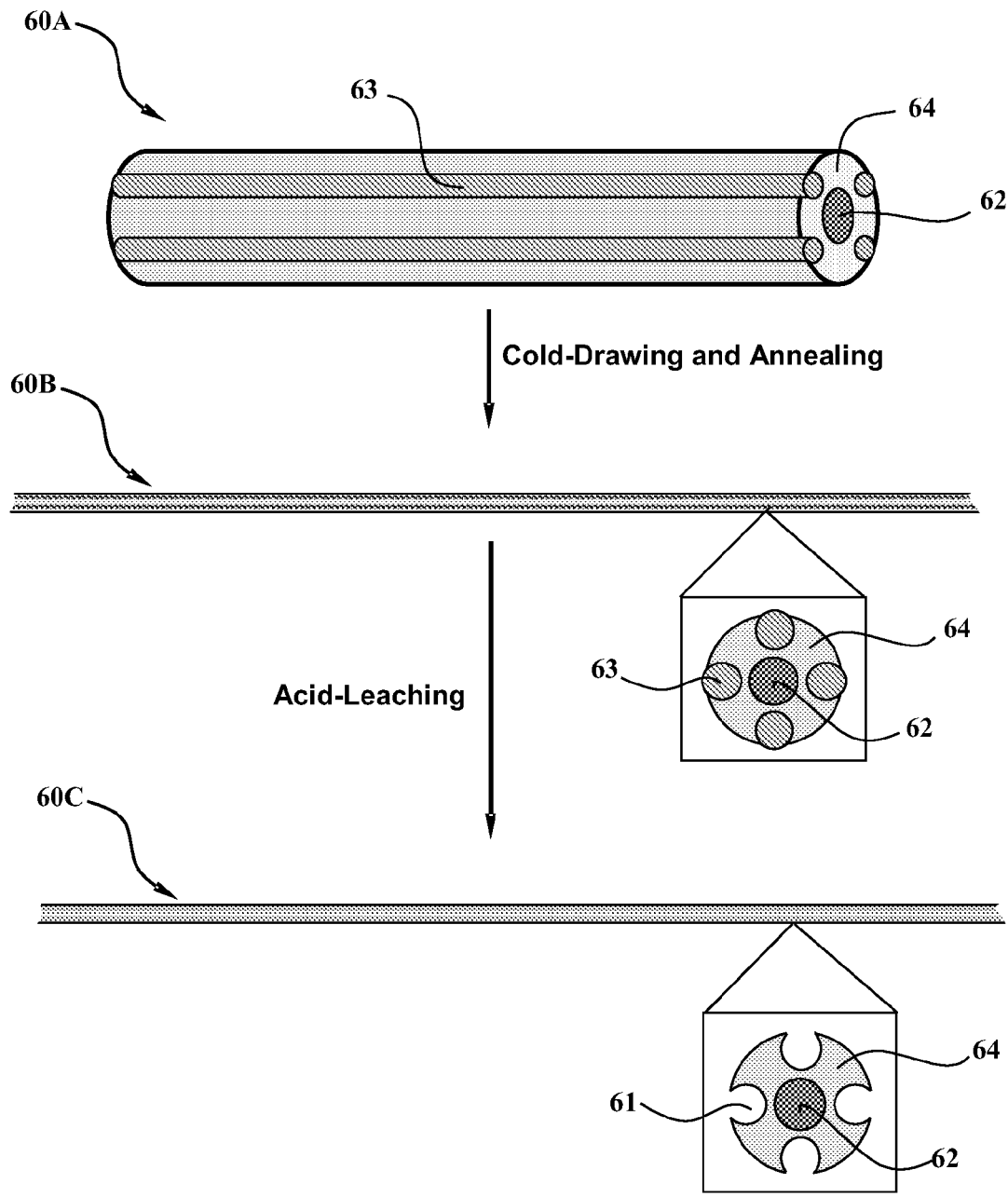
FIG. 6 illustrates a process for forming the channeled metal clad fibers, according to one embodiment of the present invention.

Disclosures of the following U.S. patents and patent application publications are incorporated herein by reference, in their respective entireties and for all purposes:

U.S. Pat. No. 5,916,514 issued on Jun. 29, 1999 for "PROCESS OF FABRICATING FIBROUS ELECTROCHEMICAL CELLS;"

U.S. Pat. No. 5,928,808 issued on Jul. 27, 1999 for "FIBROUS ELECTROCHEMICAL FEED CELLS;"

U.S. Pat. No. 5,989,300 issued on Nov. 23, 1999 for "PROCESS OF PRODUCING ELECTROCHEMICAL PRODUCTS OR ENERGY FROM A FIBEROUS ELECTROCHEMICAL CELL;"

U.S. Pat. No. 6,004,691 issued on Dec. 21, 1999 for "FIBROUS BATTERY CELLS;"

U.S. Pat. No. 6,338,913 issued on Jul. 15, 2002 for "DOUBLE-MEMBRANE MICROCELL ELECTROCHEMICAL DEVICES AND ASSEMBLIES, AND METHOD OF MAKING AND USING THE SAME;"

U.S. Pat. No. 6,399,232 issued on Jun. 4, 2002 for "SERIES-CONNECTED MICROCELL ELECTROCHEMICAL DEVICES AND ASSEMBLIES, AND METHOD OF MAKING AND USING THE SAME;"

U.S. Pat. No. 6,403,248 issued on Jun. 11, 2002 for "MICROCELL ELECTROCHEMICAL DEVICES ASSEMBLIES WITH WATER MANAGEMENT SUBSYSTEM, AND METHOD OF MAKING AND USING THE SAME;"

U.S. Pat. No. 6,403,517 issued on Jun. 11, 2002 for "SYSTEM AND PROCESS FOR MANUFACTURING MICROCELL ELECTROCHEMICAL DEVICES AND ASSEMBLIES;"

U.S. Pat. No. 6,444,339 issued on Sep. 3, 2002 for "MICROCELL ELECTROCHEMICAL DEVICE ASSEMBLIES WITH THERMAL MANAGEMENT SUBSYSTEM, AND METHOD OF MAKING AND USING THE SAME;"

U.S. Pat. No. 6,495,281 issued on Dec. 17, 2002 for "MICROCELL ELECTROCHEMICAL DEVICES ASSEMBLIES WITH CORROSION MANAGEMENT SUBSYSTEM, AND METHOD OF MAKING AND USING THE SAME;"

U.S. Pat. No. 6,884,539 issued on Apr. 26, 2005 for "MICROCELL ELECTROCHEMICAL DEVICES AND ASSEMBLIES WITH CORROSION-RESISTANT CURRENT COLLECTORS, AND METHOD FO MAKING THE SAME;"

U.S. Patent Application Publication No. 2004/0058224 published on Mar. 25, 2004 for "MICROCELL FUEL CELLS, FUEL CELL ASSEMBLIES, AND METHODS OF MAKING THE SAME;"

U.S. Pat. No. 7,354,545 issued on Apr. 8, 2008 for "SUBSTRATE-SUPPORTED PROCESS FOR MANUFACTURING MICROFIBROUS FUEL CELLS;"

U.S. Patent Application Publication No. 2004/0197557 published on Oct. 7, 2004 for "PROCESS FOR MANUFACTURING HOLLOW FIBERS;"

U.S. Patent Application Publication No. 2004/0191588 published on Sep. 30, 2004 for "HYDROGEN STORAGE SYSTEMS AND FUEL CELL SYSTEMS WITH HDYROGEN STORAGE CAPACITY;" and U.S. Pat. No. 7,229,712 issued on Jun. 12, 2007 for "FUEL CELL STRUCTURES AND ASSEMBLIES."

The present invention provides a metal clad fiber having one or more surface channels that extend along directions that are substantially parallel to the longitudinal axis of such metal fiber, for forming the inner current collector of a microfibrous fuel cell.

Specifically, such metal clad fiber comprises two or more metal layers, including at least a metal core and one or more metal protective layers formed over such metal core. Such metal protective layers contain metal or metal alloy that is different from that contained in the metal core, and they are bonded to the metal core as well as to one another at the respective interfaces by solid-phase bonding, which is described in greater detail hereinafter.

The surface channels of such metal clad fiber are formed of longitudinally-extending surface cavities that are partially embedded in at least one of the metal protective layers. Such surface channels are separated from the metal core of the metal clad fiber, while being partially exposed to a surface of such fiber, so that a fluid being passed through such surface channels is isolated from the metal core, but not from the fiber surface.

FIG. 1A shows a cross-section view of an exemplary metal clad fiber 10, according to one embodiment of the present invention.

The clad fiber 10 specifically comprises a metal core 12 and a metal protective layer 14 encapsulating such metal core. A single surface channel 11 is partially embedded in the metal protective layer 14 and partially exposed to a surface of the clad fiber 10. Further, the metal core 12 is isolated from such surface channel 11. With such configuration, a fluid passing through such surface channel 11 contacts the surface of the clad fiber 10 without contacting the metal core.

FIG. 1B shows a perspective view of the metal clad fiber 10, with the surface channel 11 extending along a direction that is parallel to the longitudinal axis 13 of the metal clad fiber 10. A fluid can therefore be passed from one terminal end of the fiber 10 to the other through such longitudinally-extending surface channel 11.

The metal core of the metal clad fiber is preferably formed of metal or metal alloy characterized by low electrical resistance (e.g., resistance less than $10\ \mu\Omega\cdot cm$, preferably less than $5\ \mu\Omega\cdot cm$), high mechanical strength, good formability, and low manufacturing cost. Suitable metals or metal alloys for forming the metal core include, but are not limited to: copper, aluminum, brass, bronze, nickel, silver, and alloys thereof.

The one or more metal protective layers are preferably formed of metal or metal alloy characterized by high corrosion-resistance, high mechanical strength, and good formability. Suitable metals or metal alloys for forming the metal protective layers include, but are not limited to: titanium, niobium, nickel, zirconium, gold, tantalum, platinum, palladium, silver, and alloys thereof.

The above lists of metals and metal alloys are only exemplary and are not intended to limit the broad scope of the present invention.

The metal core 12 and the metal outer layer 14 are preferably bonded together at their interfacial surface by solid-phase bonding, which is the bonding of two different metals or metal alloys without the formation of any liquid phase material at their interfaces.

The solid-phase bonding of two different metals is achieved by a hot co-extrusion process that is well known in the art, in which two metals are pressed together at an elevated temperature, to cause deformation of such metals in form of reduction in cross-sectional area of the metals. The elevated temperature is within a range of from just above the minimum re-crystallization temperature of the metal that has the lower re-crystallization temperature to the highest temperature at which both metals may be deformed without any pulling apart or any formation of brittle compounds or liquid phase material at the interface of the metals being bonded. By applying pressure at such elevated temperature, it is possible to solid-phase bond layers of any two or more metals or metal alloys to form a multiple-layer metal clad composite.

The strength of the solid-phase bonding is a function of the elevated temperature and the amount of deformation that such metals undergo. Preferably, the elevated temperature is within a range of from about 400° C. to about 900° C., and the amount of deformation that such metals undergo is expressed as a reduction in cross-sectional area ratios of such metals, e.g., in a range of from about 7:1 (i.e., the cross-sectional area reduces from 7 to 1 due to such deformation) to about 64:1 (i.e., the cross-sectional area reduces from 64 to 1 due to such deformation).

The solid-phase bonding formed according to the above-described method can be further strengthened by a subsequent sintering step. The thermal energy provided by such sintering step increases atomic mobility of the metals and effects growth of the bond areas at the bonding interface between the metals. As a result, the solid-phase bonding between such metals is further strengthened.

The metal clad fiber of the present invention may comprise any number of surface channels without limitation. For example, FIGS. 2A and 2B shows an exemplary metal clad fiber 20 having four longitudinally-extending surface channels 21. FIG. 3 shows another metal clad fiber 30 having six longitudinally-extending surface channels 31, and FIG. 4 shows still another metal clad fiber 40 having more than twenty surface channels 41.

Such surface channels can have any cross-sectional shape or configuration, either regular or irregular, including but not limited to circular, semi-circular, oval, crescent, cross, triangle, square, rectangular, parallelogram, trapezoidal, polyhedron, star-like, etc. FIGS. 1-4 only provide illustrative examples and should be construed to limit the broad scope of the present invention.

The metal clad fiber of the present invention may comprise more than two metal layers, as shown in FIG. 5. Specifically, the metal clad fiber 50 comprises a metal core 52 formed of a first metal or metal alloy, a first metal protective layer 54 formed of a second metal or metal alloy and encapsulating the metal core 52, and a second metal protective layer 56 formed of a third metal or metal alloy and encapsulating the first metal protective layer 54, wherein the metal core 52 and the first and second metal protective layers 54 and 56 are bonded to one another at their respective interfaces by solid-phase bonding.

Four longitudinally-extending surface channels 52 are partially embedded in the metal protective layers 56 and 54, with openings to the surface of the clad fiber 50.

The metal core 52 is preferably formed of metal or metal alloy having low electrical resistance (i.e., resistance less than 10 $\mu\Omega\cdot$cm, preferably less than 5 $\mu\Omega\cdot$cm), high mechanical strength, good formability, and low manufacturing cost, such as copper, aluminum, brass, bronze, nickel, silver, etc., and alloys thereof. More preferably, the metal core 52 is formed of a metal selected from the group consisting of copper and aluminum, and alloys thereof, and most preferably, the metal core 52 is formed of copper or copper-containing metal alloy.

The first metal protective layer 54 and the second metal protective layer 56 are preferably formed of metal or metal alloy having high corrosion-resistance, high mechanical strength, and good formability, such as titanium, niobium, nickel, zirconium, gold, tantalum, platinum, palladium, silver, etc., and alloys thereof. More preferably, the metal or metal alloy for forming the first metal protective layer 54 is selected from the group consisting of titanium, niobium, nickel, and alloys including the same, and the metal or metal alloy for forming the second metal protective layer 56 is selected from the group consisting of niobium, platinum, tantalum, gold, zirconium, and alloys including the same. Most preferably, the first metal protective layer 54 is formed of titanium or titanium-containing alloy, and the second metal protective layer 56 is formed of niobium, tantalum, or niobium- and/or tantalum-containing alloy.

As mentioned hereinabove, the specific metals and metal alloys identified herein are only exemplary and are not intended to limit the broad scope of the present invention.

The following is a list of preferred compositions of two- or three-layer metal clad fibers useful for practice of the present invention:

| No. | Metal Core | First Metal Protective Layer (Inner) | Second Metal Protective Layer (Outer) |
|---|---|---|---|
| 1 | Copper | — | Titanium |
| 2 | Copper | — | Nickel |
| 3 | Copper | Titanium | Platinum |
| 4 | Copper | Titanium | Gold |
| 5 | Copper | Titanium | Tantalum |
| 6 | Copper | Titanium | Niobium |
| 7 | Copper | Titanium | Zirconium |
| 8 | Copper | Niobium | Platinum |
| 9 | Copper | Nickel | Platinum |
| 10 | Copper | Nickel | Gold |

The above-described channeled metal clad fibers can be formed by a process illustrated in FIG. 6:

(1) forming a composite metal billet 60A (i.e., a precursor structure) having a longitudinal axis and comprising a metal core 62 and one or more metal protective layers 64 encapsulating such metal core, with one or more removable metal components 63 partially embedded in at least one of such metal protective layers 64 and partially exposed on a surface of such metal billet 60A. Such removable metal components 63 extend along the longitudinal axis of such metal billet 60A. Such composite metal billet 60A are preferably formed by the well-known hot co-extrusion techniques as described hereinabove, so that the one or more metal protective layers 64 are bonded to the metal core 62 as well as to one another by solid-phase bonding;

(2) drawing the metal billet 60A into a thin metal wire or a metal fiber 60B, via a series of cold drawing and annealing steps, wherein the metal fiber 60B so formed comprises the metal core 62, the one or more metal protective layers 64, and the one or more removable metal components 63 (see the enlarged cross-sectional view of the metal fiber 60B); and (3) selectively removing the removable metal components from the metal fiber 60B, via acid-leaching or other material-removal techniques, in such manner that the metal core 62 and the one or more metal protective layers 64 remain intact and form a metal fiber 60C having one more longitudinally-extending surface channels 61 (see the enlarged cross-sectional view of the channeled metal fiber 60C).

The removable metal components 63 may comprise any metal or metal alloy that can be selectively removed without impairing the structural integrity of the metal core and the metal protective layers. Such removable metal components preferably comprise metal or metal alloy with sufficient formability, good removability, and low manufacturing cost, such as copper, aluminum, brass, bronze, nickel, silver, etc., and alloys thereof. More preferably, the removable metal components 63 are formed of a metal selected from the group consisting of copper and aluminum, and alloys thereof, and most preferably, the removable metal components 63 are formed of copper or copper-containing metal alloy.

Because the metal core 62 are encapsulated by the metal protective layers 64 and is not exposed to the surface of the metal fiber 60B (see FIG. 6), such metal core 62 may comprise the same metal or metal alloy as that of the removable metal components 63, and such metal core 62 will remain intact during the removal step when the removable metal components 63 (which are partially exposed on the surface of the metal fiber 60B) is selectively removed.

The selective removal of the removable metal components 63 may be carried out by any suitable techniques, which include but are not limited to acid-leaching techniques.

The above-described channeled metal clad fibers can be advantageously used for forming inner current collectors in microfibrous fuel cell structures described in U.S. Pat. Nos. 5,916,514; 5,928,808; 5,989,300; 6,004,691; 6,338,913; 6,399,232; 6,403,248; 6,403,517; 6,444,339; 6,495,281; 6,884,539; 7,354,545; and 7,229,712; and U.S. Patent Application Publication Nos. 2004/0058224; 2004/0197557; and 2004/0191588. The surface channels of such metal clad fibers can function as the inner fluid passages that are required for such microfibrous fuel cells.

FIG. 7 shows a cross-sectional view of an exemplary microfibrous fuel cell 70, which comprises a hollow microfibrous membrane separator 75 that contains an electrolyte medium therein and defines a bore side and a shell side. At the bore side of such membrane separator 75 are placed an inner current collector 72 and an inner electrocatalyst layer 74, and at the shell side of such membrane separator 75 are placed an outer current collector 78 and an outer electrocatalyst layer 76. A wrapping element 79 winds around such microfibrous fuel cell 70 and wraps it into a compact and unitary cell.

The inner current collector 72 is formed of a double-layer metal clad fiber having four surface channels 71, as described hereinabove. A fuel- or oxidant-containing fluid can be passed through such surface channels 71 of the inner current collector 72 to feed the electrochemical reaction at the interface between the membrane separator 75 and the inner electrocatalyst layer 74.

Such configuration not only obviates the need for providing a separate inner fluid passage, but also significantly increases the contacting surface area between the inner current collector 72 and the inner electrocatalyst layer 74, thereby increasing the performance of the fuel cell and reducing the risk of electrical disconnection.

Further, since the inner fluid passages 71 are partially embedded in the inner current collector 72 and structurally supported thereby, the risk of blockage of such passages due to deformation of the membrane separator 75 is significantly reduced. Therefore, the microfibrous fuel cell 70 can be tightly wrapped by the wrapping element 79 to reduce the contact resistance between the outer current collector 78 and the outer electrocatalyst layer 76 and to achieve higher and more efficient power generation, without deforming the inner fluid passages 71.

For microfibrous fuel cell applications, the above-described channeled metal clad fibers preferably have an outer diameter within a range of from about 100 µm to about 10 mm, more preferably from about 100 µm to about 1000 µm, and most preferably from about 200 µm to about 500 µM.

If the channeled metal clad fiber comprises a double-layer structure as described hereinabove, the metal core may have an outer diameter within a range of from about 10 µm to about 10 mm, more preferably from about 100 µm to about 1000 µm, and most preferably from about 150 µm to about 500 µM.

If the channeled metal clad fiber comprises a three-layer structure as described hereinabove, the first metal protective layer may have an outer diameter within a range of from about 100 µm to about 10 mm, more preferably from about 100 µm to about 1000 µm, and most preferably from about 200 µm to about 500 µm, while the metal core may have an outer diameter within a range of from about 10 µm to about 10 mm, more preferably from about 100 µm to about 1000 µm, and most preferably from about 150 µm to about 500 µm.

However, the microcell current collectors of the present invention are not limited to the two-layer or three-layer structures. A person ordinarily skilled in the art can readily design channeled metal clad fibers having additional layers of metal or non-metal conductive materials, such as conductive polymers, carbonaceous materials, or conductive ceramics, etc., for the purpose of further enhancing the corrosion resistance and mechanical strength of such channeled metal clad fibers for forming microcell current collectors useful for practicing the present invention. Moreover, the metal core of such channeled metal clad fiber is not limited to the solid form as described hereinabove. In a preferred embodiment of the present invention, such metal core may be a hollow, tubular metal element, through which heat-exchanging fluid (such as air or heat-exchanging liquids) can be passed. In such configuration, the inner current collectors concurrently function as heat-exchanging tubes, for conducting heat generated by the electrochemical reaction out of the microcell system.

In an alternative embodiment, the present invention provides a microfibrous fuel cell structure comprising an inner current collector formed of a channeled metal fiber having a single, un-clad metal layer, as shown in FIG. 8.

Specifically, the microfibrous fuel cell 80 comprises a hollow microfibrous membrane separator 85 that contains an electrolyte medium therein and defines a bore side and a shell side. At the bore side of such membrane separator 85 are placed an inner current collector 82 and an inner electrocatalyst layer 84, and at the shell side of such membrane separator 85 are placed an outer current collector 88 and an outer electrocatalyst layer 86. A wrapping element 89 winds around such microfibrous fuel cell 80 and wraps it into a compact and unitary cell.

The inner current collector 82 is formed of a single-layer, unclad metal fiber, which has four surface channels 81. A fuel- or oxidant-containing fluid can be passed through such surface channels 81 of the inner current collector 82 to feed the electrochemical reaction at the interface between the membrane separator 85 and the inner electrocatalyst layer 84.

Such unclad, channeled metal fiber of FIG. 8 functions in a manner similar to the double-layer metal clad fiber of FIG. 7, and is therefore included in the broad scope of the present invention.

The process described hereinabove for forming the channeled metal clad fibers can be applied for forming channeled metal fibers that are unclad.

Specifically, a composite metal billet (i.e., a precursor structure) can be formed by hot co-extrusion, which has a longitudinal axis and comprises a supporting metal component with one or more removable metal components partially embedded in such supporting metal component and partially exposed on a surface of such metal billet, while such removable metal components extend along directions that are parallel to the longitudinal axis of such metal billet. Such composite metal billet can be drawn into a metal fiber via a series of cold drawing and annealing steps, wherein such metal fiber comprises the supporting metal component and the one or more removable metal components, in correspondence with those of the composite metal billet. Subsequently, the removable metal components are selectively removed from such metal fiber, via acid-leaching or other material-removal techniques, in such manner that the supporting metal component remains intact and forms a metal fiber having one or more longitudinally-extending surface channels.

In certain embodiments, electrical conductivity of a channeled metal clad fiber may be enhanced by presence of at least one additional conductive material in at least one protective layer and arranged between channels defined in the at least one protective layer. FIG. 9 shows a fibrous article 90 including a metal-containing core 92 preferably formed of a first metal or metal alloy, a metal-containing protective layer 94 preferably formed of a second metal or metal alloy and encapsulating the core 92, and conductors 98 contained in the protective layer 94. Channels 91 are defined in the protective layer 91 but do not contact the core 92. The conductors 98 preferably contain metal, and may be formed of metal or metal alloy. The conductors 98 may be of the same or different material composition as the core 92. ("Different material composition" in the context of different elements of a metal clad fiber or fibrous article as described herein refers to differences in presence, concentration, or state (e.g., crystallinity or grain structure) of constituents or constituent groups.) The conductors 98 are preferably formed of a metal selected from the group consisting of copper and aluminum, and alloys thereof, and most preferably, the conductors 98 are is formed of copper or copper-containing metal alloy. The conductors 98 may be encased in the protective layer 94 and therefore isolated from contact with the core 92 as shown in FIG. 9, or in an alternative embodiment the conductors 98 may contact, or even be integrally formed with the core 92 (e.g., as a star-shaped or asterisk-shaped core). The protective layer 94 serves to isolate the conductors 98 and the core 92 from contact with the channels 91 and any corrosive material flowable therein.

Preferably, the core 92 and the protective layer 94, and the protective layer 94 and the conductors 98, are bonded together along respective interfaces by solid-phase bonding. Four longitudinally-extending surface channels 92 are defined in the protective layer 94, with openings to the surface of the fibrous article 90.

The metal core 92 is preferably formed of metal or metal alloy having low electrical resistance (i.e., resistance less than 10 μΩ·cm, preferably less than 5 μΩ·cm), high mechanical strength, good formability, and low manufacturing cost, such as copper, aluminum, brass, bronze, nickel, silver, etc., and alloys thereof. More preferably, the metal core 92 is formed of a metal selected from the group consisting of copper and aluminum, and alloys thereof, and most preferably, the metal core 92 is formed of copper or copper-containing metal alloy.

The protective layer 94 is preferably formed of metal or metal alloy having high corrosion-resistance, high mechanical strength, and good formability, such as titanium, niobium, nickel, zirconium, gold, tantalum, platinum, palladium, silver, etc., and alloys thereof.

A fibrous article according to the embodiment shown in FIG. 9 may be enhanced by addition of a second protective layer, such as shown in FIG. 10. FIG. 10 shows a fibrous article 100 including a metal-containing core 102 preferably formed of a first metal or metal alloy, a metal-containing first protective layer 104 preferably formed of a second metal or metal alloy and encapsulating the core 102, a metal-containing second protective layer 106 preferably formed of a second metal or metal alloy and encapsulating the first protective layer 104, and conductors 108 contained in at least one of the first protective layer 104 and the second protective layer 106 (preferably contained in the first protective layer 104). Channels 101 are defined into the first and second protective layers 104, 106 (but preferably bounded only by the material of the second protective layer 106). The core 102 and conductors 101 are isolated from contacting the channels 101. Preferably, the core 102 and the first protective layer 104, the first protective layer 104 and the conductors 108, and the second protective layer 106 and the first protective layer 104, are bonded together along respective interfaces by solid-phase bonding.

The metal core 102 is preferably formed of metal or metal alloy having low electrical resistance high mechanical strength, good formability, and low manufacturing cost, such as copper, aluminum, brass, bronze, nickel, silver, etc., and alloys thereof. The first protective layer 104 and the second metal protective layer 106 are preferably formed of metal or metal alloy having high corrosion-resistance, high mechanical strength, and good formability, such as titanium, niobium, nickel, zirconium, gold, tantalum, platinum, palladium, silver, etc., and alloys thereof. Preferably, the first protective layer 104 comprises material selected from the group consisting of titanium, niobium, nickel, and alloys including the same, and the second protective layer 106 comprises material selected from the group consisting of niobium, platinum, tantalum, gold, zirconium, and alloys including the same. Most preferably, the first protective layer 104 is formed of titanium or titanium-containing alloy, and the second protective layer 106 is formed of niobium, tantalum, or niobium-and/or tantalum-containing alloy.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various elements and steps disclosed separately herein may be aggregated in different combinations and permutations to provide additional advantage(s) as may be desirable for a particular end use or application. Correspondingly, the invention as hereinafter claimed is intended to be broadly construed and interpreted, as including all such variations, modifications and alternative embodiments, within its spirit and scope.

What is claimed is:

1. A fibrous article having a longitudinal axis, the article comprising:
    a metal-containing core;
    a metal-containing first protective layer bonded to the core by solid-phase bonding, with the first protective layer having a different material composition than the core;
    one or more surface channels extending along directions that are substantially parallel to the longitudinal axis; and
    at least one metal-containing conductor contained in the first protective layer, isolated from contact with the one or more surface channels, and having a different material composition than the first protective layer;
    wherein the core is isolated from contacting the one or more surface channels.

2. The fibrous article of claim 1, wherein the core comprises material selected from the group consisting of copper, aluminum, brass, bronze, nickel, silver, and alloys including the same.

3. The fibrous article of claim 1, wherein the at least one metal-containing conductor is solid phase bonded to the first protective layer.

4. The fibrous article of claim 1, wherein the at least one metal-containing conductor comprises a plurality of metal-containing conductors.

5. The fibrous article of claim 1, wherein the one or more surface channels comprises a plurality of surface channels.

6. The fibrous article of claim 1, wherein the at least one metal-containing conductor is encased in the first protective layer and is isolated from contact with the core.

7. The fibrous article of claim 1, wherein the at least one metal-containing conductor has substantially the same material composition as the core.

8. The fibrous article of claim 1, further comprising a metal-containing second protective layer bonded to the first protective layer.

9. The fibrous article of claim 1, characterized by a cross-sectional outer diameter in a range of from about 10 microns to about 5 millimeters.

10. A microfibrous fuel cell, comprising:
- a hollow microfibrous membrane separator containing an electrolyte medium and defining a bore side and a shell side;
- an inner current collector and an inner electrocatalyst structure at the bore side of said hollow microfibrous membrane separator; and
- an outer current collector and an outer electrocatalyst structure at the shell side of said hollow microfibrous membrane separator,
- wherein the inner current collector comprises the fibrous article of claim 1.

11. A channelized current collector structure for a fuel cell, comprising:
- a metal fiber core; and
- a channelized metal clad layer on the metal fiber core, wherein the channelized metal clad layer includes longitudinally extending channels, and radially outwardly extending portions between adjacent channels, and wherein the radially outwardly extending portions of the channelized metal clad layer include longitudinally extending metal conductors encased therein.

12. The channelized current collector of claim 11, wherein:
- the metal fiber core comprises metal selected from the group consisting of copper, aluminum, brass, bronze, nickel, silver, and alloys thereof;
- the channelized metal clad layer comprises metal selected from the group consisting of titanium, niobium, nickel, zirconium, gold, tantalum, platinum, palladium, silver, and alloys thereof; and
- the metal conductors comprise metal selected from the group consisting of copper, aluminum, and alloys thereof.

13. The channelized current collector of claim 11, wherein each of the metal fiber core and the metal conductors comprises copper or copper alloy.

14. The channelized current collector of claim 11, including four longitudinally extending channels.

15. The channelized current collector of claim 11, including six longitudinally extending channels.

16. The channelized current collector of claim 11, further comprising a second metal clad layer on the channelized metal clad layer.

17. The channelized current collector of claim 16, wherein the second metal clad layer comprises metal selected from the group consisting of niobium, platinum, tantalum, gold, zirconium, and alloys thereof.

18. The channelized current collector of claim 11, having a cross-sectional outer diameter in a range of from about 10 microns to about 5 millimeters.

19. A fuel cell comprising the channelized current collector of claim 11.

* * * * *